United States Patent Office.

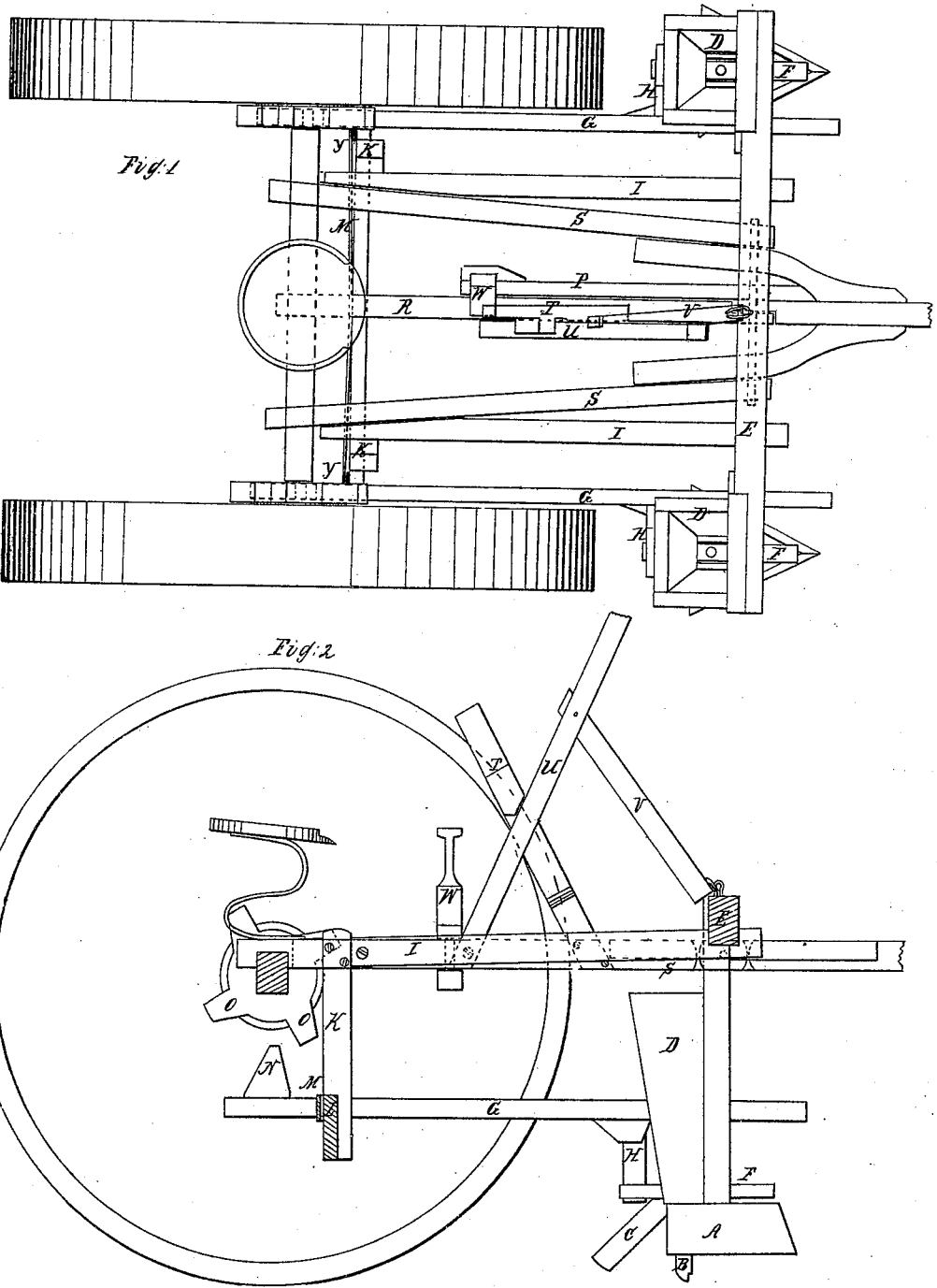

J. WARREN HITCHCOCK AND JAMES K. DEYO, OF MORRISVILLE, NEW YORK.

Letters Patent No. 71,172, dated November 19, 1867.

IMPROVEMENT IN CORN-PLANTERS.

The Schedule referred to in these Letters Patent and making part of the same.

TO WHOM IT MAY CONCERN:

Be it known that we, J. WARREN HITCHCOCK and JAMES K. DEYO, of Morrisville, in the county of Madison, and State of New York, have invented a new and valuable Improvement in Corn-Planters; and we do hereby declare that the following is a full, clear, and exact description of the construction and operation of the same, reference being had to the annexed drawings, making a part of this specification, and to the letters and figures of reference marked thereon.

The object of our invention is to furnish a corn-planter to agriculturalists that shall be more simple and cheap in construction and operation, as well as more permanently-useful, than any similar device heretofore known or used.

To this end we construct a corn-planter, in the usual form, with two large wheels, tongue, and driver's seat, as shown on the drawings, and attach thereto the devices hereinafter named.

Letters A A are the ploughs, letters B B are drill-ploughs, and C C are coverers. These drill-ploughs are placed immediately below and behind the grain-tubes. The coverers are attached to the sides of the tubes, and are adjusted, as shown, in such a manner as to cover the seed from the outer side of the furrow. Letters D D are grain-tubes, in which the seed is placed to be sown. These tubes are connected and supported at their tops by a cross-bar, E. Letters F F are sliding-bars, which pass through the bottom parts of the tubes. They are made to slide back and forth by the devices hereinafter mentioned, and have small holes passing through them, in which the grain is allowed to pass to the furrow. Letters G G are long sliding-bars that pass through suitable openings on the inner sides of the grain-tubes, and their rear ends rest and slide on the swinging-bar L, hereafter named. A brace, H, connects each of the bars G G with the bars F F, and secures a uniformity of movement between them. Letters I I are beams that extend from the cross-bar E to a point near the axle of the carriage, where they are bolted, respectively to beams that extend from the axle of the carriage to the hounds of the tongue, as shown on the drawings. On the outer sides of these beams I I, and at their rear ends respectively, we attach upright arms K K, which extend from the said last-mentioned beams to the swinging-bar L, and to which they are firmly bolted. This swinging-bar supports the rear end of the bars G G, near the ends of which they slide in slots, and it also serves as support for the spring next mentioned. Letter M is a steel spring, consisting of a plate of steel of suitable thickness, and extending to the entire length of that part of the swinging-bar L inside the slots above referred to. It is fastened by bolts to the middle of said bar, and operates upon the machinery as hereinafter shown. Letter N is a cog attached to the rear end of each of the sliding-bars G G. It is designed to mesh and work with the cogs on the axle marked O.

We raise and lower the ploughs and coverers to and from the ground by the means following, namely, inside the hounds of the corriage-tongue, and attached thereto, we place the bar P, extending rearward to a point about three feet, more or less, from the driver's seat. By the side of this bar P, and connected with it at its forward end, we place the bar R, which extends to the axle, and is firmly attached thereto. At the front junction of these two bars, they are united by a bolt that passes through them—the hounds of the tongue and the bars S S, hereinafter mentioned. Letter T is an upright arm, attached at its lower end to the bar R, and is notched, as shown on the drawings, to form a support for the lever U. This lever U is fastened at its lower end by a bolt to the side of the bar R. It has a brace, V, extending, as shown, to the cross-bar E, and to which it is connected by a swivel and ring. W is a button placed on the top of the rear end of bar P. These devices enable the driver to raise or lower the ploughs, &c., at will, by using the lever U, and he can secure any desired position of the same by the use of the notch on the arm T and the button W. Inside of the sliding-bars G G, and immediately in front of the springs mentioned, we fasten small pins, Y Y, whose office will be explained when we exhibit the operation of the corn-planter in the next paragraph.

Our corn-planter is operated as follows: We fill the tubes with grain, place the driver on his seat, and set the team in motion. The lever U is now at liberty, and the button W is either turned to the right or left, as may be desirable. The cogs on the axle mesh with the cog on the rear end of the levers G G, and, by means of the pins Y Y, draw back the spring. When the cog N slips from the cogs O the spring forces the beams G G forward again, and this movement is repeated four times with each revolution of the axle. The spring M, coming in contact with the pins Y Y, sends the beams forward with a sharp rapid motion, and thereby the grain is kept moving in the tubes. At each forward movement, the opening in the bars F F fill with seeds, and at each backward movement, the same is brought to the rear of the grain-tubes and deposited in the drill made by the drill-ploughs. The coverers follow and cover the seeds. It is thus readily seen, that by our devices we are enabled to plant two rows of seeds at the same time, and to do it with great rapidity.

What we claim as our invention, and desire to secure by Letters Patent, is—

A corn-planter, having drill-ploughs B, coverers C, sliding-bars F F and G G, spring M, pins Y Y, and hoisting apparatus, as described, constructed and arranged substantially as herein specified.

J. WARREN HITCHCOCK,
JAMES K. DEYO.

Witnesses:
C. W. BRASSE,
A. DAVIS.